United States Patent Office 3,517,982
Patented June 30, 1970

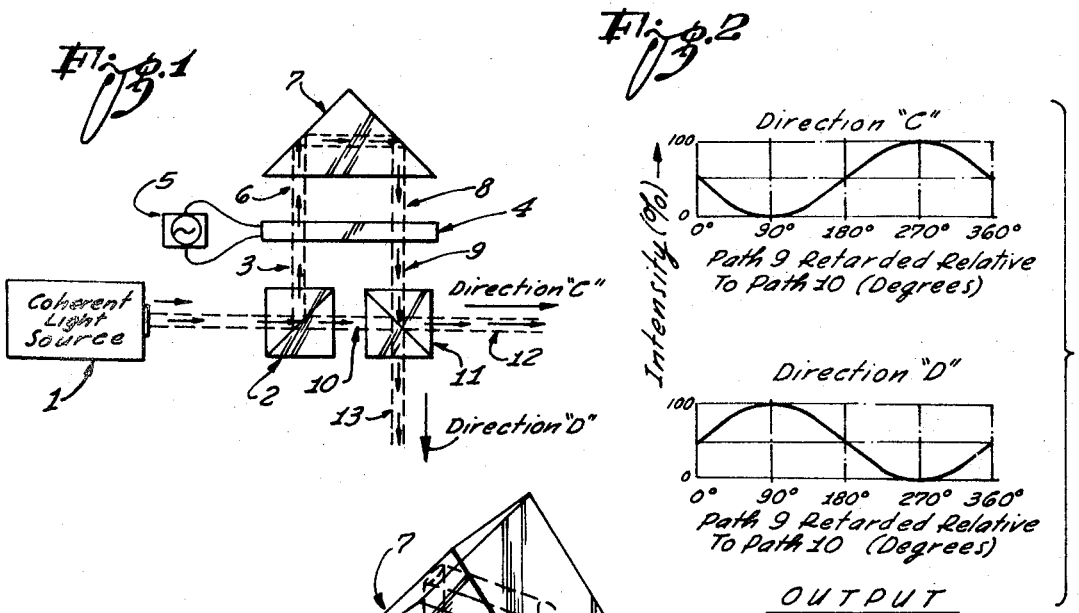
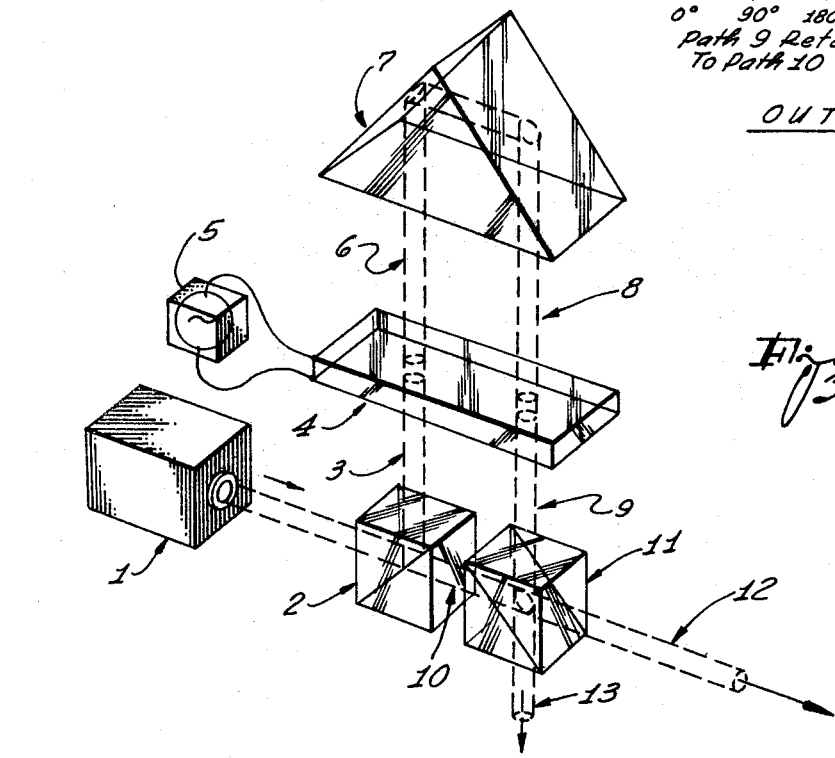
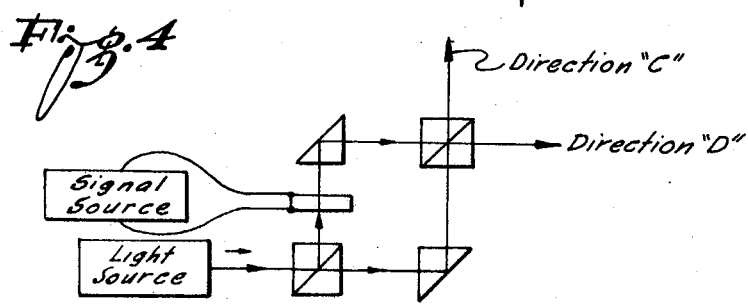

3,517,982
COHERENT LIGHT MODULATING SYSTEM
Giusto Fonda-Bonardi, Los Angeles, Calif., assignor to Litton Systems, Inc., Beverly Hills, Calif., a corporation of Maryland
Filed Sept. 6, 1966, Ser. No. 577,299
Int. Cl. G02f 1/28
U.S. Cl. 350—160
4 Claims

ABSTRACT OF THE DISCLOSURE

A system for modulating a coherent light beam wherein the beam is divided into two portions, and the time-space relationship of one or both portions of the divided beam is varied in response to an input signal. The two portions are then recombined in a manner such that the interaction of the two portions of the beam results in a composite beam whose magnitude has an ascertainable relationship with the magnitude of the input signal.

---

This invention relates to an electro-optical system for modulating coherent light.

The development of narrow band coherent light sources such as optical lasers has greatly extended the portion of the electromagnetic wave spectrum which is available for communications and related purposes. The optical portion of the spectrum is deemed to extend from the infrared through the visible and ultraviolet wave lengths. Because of the extremely high frequencies associated with such short wave lengths, coherent light beams produced by optical lasers are inherently capable of transmitting enormous quantities of information. In order to realize the communication potential of the now accessible optical spectrum, it is necessary to provide apparatus for modulating the output of the optical maser at high modulation frequencies.

A number of light modulators have been described which operate by means of variations in one or more of the parameters which govern the interaction between light waves and matter. Some of the effects which have been considered are the Kerr and Pockels effects, produced by electric fields acting on certain media through which the light is passed and the Voigt, the Cotton-Mouton and the Faraday effects produced by the analogous action of magnetic fields. These as well as other electro-optical and magneto-optical effects may be utilized to modulate the frequency, phase, polarization, amplitude or propagation direction of electro-magnetic waves.

All of these prior art methods have undesirable characteristics. For example, one of the prior art methods of modulation utilizes various shuttering techniques. These devices are capable only of modulating in an "on-off" manner such as is useful for transmitting messages in a pulse code. However, it is desirable to modulate coherent light in such a manner that the amplitude conveys information greater than "on" or "off."

Other prior art methods provide amplitude modulation, but the relationship between the amplitude of the input signal and the amplitude of the modulated light may be so irregular that it would be difficult to translate the modulated signal into useful information. It is desirable to have an ascertainable relationship between the amplitude of the input signal and the amplitude of the modulated light.

Other prior art methods utilize electromagnetic fields acting upon a medium to deflect the beam being modulated. The deflection of the beam causes a variable amount of the beam to pass through a fixed aperture. This method has high power requirements and an irregular relationship between the input signal and the intensity of the modulated beam. It is desirable to keep power requirements at a minimum while generating an output signal with an ascertainable relationship to the input signal.

Many of the prior art methods utilize absorption of a portion of the beam being modulated. Such absorption generates heat which tends to make the systems unstable. Dimensional stability is of prime importance in optical systems since many parameters will change characteristics with a movement of a fraction of a wave length of light.

Other prior art modulators are limited in the frequency of modulation due to the high power requirements associated with high frequency modulation of the input parameter. For example, the power required to modulate a magnetic field increases exponentially with the frequency of modulation. It is desirable to keep power requirements to a minimum while concurrently using ultrahigh-frequency modulation so as to take maximum advantage of the tremendous information carrying capability of coherent light.

It is an object of this invention to modulate coherent light so that the amplitude conveys information greater than "on" or "off."

A further object of this invention is to have an ascertainable relationship between the amplitude of the input signal and the amplitude of the modulated light.

Another object of this invention is to keep power requirements at a minimum while generating an output signal with an ascertainable relationship to the input signal.

It is a further object of this invention to provide a highly stable system for modulating coherent light.

An additional objective of this invention is to take maximum advantage of the information carrying capability of coherent light. These objects are accomplished by our invention which is described below.

Modulation of coherent light is accomplished by dividing a coherent light beam into two portions, shifting the time-space relationship of one or both portions of the divided beam and then recombining the two portions in such a manner that the interaction of the two parts of the beam and the combining medium results in the emission of a composite beam or beams with an ascertainable relationship to the input signal.

In a preferred embodiment of the present invention the input coherent light source is directed at an optical beam splitter which operates upon the principle of frustrated total internal reflection. The air gap is adjusted so that 50% of the input light will pass through the beam splitter and 50% will be reflected at a right angle to the input beam.

The reflected portion of the beam is then passed through an electrically variable dielectric (such as ammonium dihydrogen phosphate).

A modulating signal applied to the electrically variable dielectric at a selected intensity will cause a phase shift between 0° and —180° of this portion of the beam.

This portion of the beam so modified is redirected by a reflecting prism into a second beam splitter which also receives the unshifted half of the input beam.

The direction of the resultant beam is determined by the phase relationship between the portion of the beam which has not been modified and the portion of the beam which has taken the path through the phase shifting means.

For purposes of discussion "primary direction" will refer to the output intended to convey information while "secondary direction" will refer to the resulting complementary output.

When the phase relationship is such that the two elements of the beam in the primary direction are exactly 180 degrees out of phase and of equal magnitude (since the input beam was divided in half) complete interference will result in the primary direction and all of the light will be emitted in phase in the secondary direction. If the phase relationship is such that the two components in the primary direction are exactly in phase, they will reinforce each other and 100% of the output will be in the primary direction. The output in the secondary direction would then be zero.

Thus it is seen that the intensity of the output in the primary direction may be varied from zero to one hundred percent by changing the length of the path of one portion of the input beam by one half wave length of light.

This embodiment permits the amplitude of the primary output to be controlled so that the amplitude may be used to convey useful information greater than "on-off."

The relationship between the intensity of the modulating signal and the amplitude of the output signal is easily ascertained.

The phase shift of the modified portion of the beam bears a straight line relationship to the voltage impressed upon the electrically variable dielectric. This phase shift in turn causes a sinusoidal variation of the output between the primary and secondary direction.

It is a feature of this invention that low power is required since complete modulation may be affected by changing the optical length of a portion of the beam one half of the wave length of light.

Since the required change in the optical path length can be accomplished with a relatively small dielectric and low voltage, the total power required to drive the system at a given frequency is reduced to a minimum. Thus the system may be driven at very high frequencies with a minimum of heat and instability which is usually associated with high power requirements.

The lack of energy absorption within the system contributes to the inherent stability of the system.

These and other objects and features of this invention will be better understood upon consideration of the following detailed description and the accompanying drawings in which:

FIG. 1 is a schematic drawing of one embodiment of this invention.

FIG. 2 represents the amplitude of the output for varying degrees of retardation of the portion of the beam passed through the variable optical length path.

FIG. 3 is a perspective view of one embodiment of the present invention.

FIG. 4 is a schematic drawing of an embodiment of this invention which would minimize changes in the phase relationship of the two paths due to expansion or contraction of the supporting means due to temperature changes.

The same reference characters are used to indicate identical elements in the several figures of the drawing. Referring now to FIG. 1, a coherent beam splitter 2 is placed in the path of a coherent light source 1. The beam splitter 2 is selected to be compatible with the wave length of the source light 1, and have an interface angle of 45° with respect to the surfaces of the cube. The interface clearance is adjusted so that one half of the source light passes through the cube substantially undeflected. The other one-half of the input beam is reflected at an angle of 90° to the input source.

The reflected one-half of the beam is passed through a medium 4 whose optical length may be changed by the application of electric signals. The phase relationship of this portion of the beam may be varied as a function of the electric signal applied to medium 4. One medium which demonstrates such a characteristic is a piezoelectric crystal. Another is a nitrobenzene solution.

The beam is passed through a totally reflecting prism 7 so that the direction is reversed. The reflected beam is passed through the medium 4 a second time where it is further modified by the electric signal being applied to that medium.

The beam is directed into a recombining prism 11 where it is recombined with the unmodified portion of the input beam 10. The direction of exit from the recombining prism 11 is a function of the phase relationship of the two input beams. If the modified beam 9 is retarded 90° with respect to the unmodified beam 10 complete interference will result in direction C and total emission will occur in direction D. Similarly if modified beam 9 is retarded 270° with respect to the unmodified beam 10, total interference will result in direction D and total emission will occur in direction C. It is therefore seen that 100% modulation of the output in either direction C or direction D may be obtained by inducing a 180° phase shift in the modified portion of the beam. Obviously, variations between these limits are easily and accurately controllable.

It will be noted that the embodiment of FIG. 1 may be modified so that the output signal may be generated by physical changes.

One such modification would be to mount the optical components upon supporting means of known thermal expansion characteristics. Since the length of the detoured path is longer than the path passing directly through the system the change in physical dimensions incident to changes in temperature would be proportionately greater. As the longer path differs from the shorter path by the length of one wave length, a complete cycle will be generated in direction C and D. It is therefore seen that digital information bearing a direct relationship to the temperature change of the supporting means may be translated directly from thermal expansion to an output signal.

FIG. 2 depicts the intensity of output in direction C and direction D as a function of phase relation of input beams 9 and 10. It is seen that 100% attenuation of the output in either direction may be obtained by shifting the phase of the modified beam by 180°. The initial 90° phase differential may be obtained by the mechanical positioning of the recombining prism.

FIG. 3 is a perspective view of the embodiment schematically depicted in FIG. 1.

FIG. 4 is a schematic drawing of an embodiment of the invention where temperature effects would be minimized.

Since the direction of output of the optical system depends upon the phase relationship of the two portions of the beam, it is necessary to control the relative path lengths to a fraction of a wave length of light. One possible method is to arrange the components symmetrically as illustrated in FIG. 4 so that the path length between separation and recombination of the beam is substantially identical.

Expansion and contraction of the system would be self-compensating when exposed to temperature changes.

Interference filters may also be used for dividing and recombining coherent light in the same manner as the optical beam splitter utilizing frustrated total internal reflection is employed in the preferred embodiment.

In order to facilitate the practice of the invention certain design values will now be given.

Obviously the invention may be embodied in specifically different forms so that the values given are not to be construed in a limiting sense.

In an exemplary embodiment, a ruby laser was used as a source of coherent light. An interface gap of approximately $1/10\lambda$ was required to divide the input beam in half. The reflected portion of the beam was passed through approximately 10 centimeters of nitrobenzene and then redirected to a recombining prism by means of a totally internal reflecting prism. A total shift in direction of output was found to occur upon application of an electromotive force of 500 volts to the nitrobenzene.

From the foregoing description it is obvious that the invention may be embodied in a variety of forms other than those specifically described hereinbefore by way of example. Other kinds of beam splitters and recombiners may be used.

Various kinds of mediums which have optical lengths variable by signal, i.e., electrically variable dielectrics, may be used.

Other circuitry may be employed for the input signal. Such modified forms come within the purview of the appended claims.

What is claimed is:

1. A system for modulating a coherent light beam comprising:
   (a) a coherent light source to provide a coherent light beam;
   (b) beamsplitting means to divide said beam into a first and second light path;
   (c) variable optical delay means disposed in said first light beam to vary the phase of the light traveling in said first path in response to an input signal applied to said variable optical delay means;
   (d) recombining means disposed in said first and second light paths to recombine the light in said first and second light paths whereby the amplitude of the light exiting from said recombining means in each of said first and second paths is dependent upon the phase relationship of the light in said first and second paths; and
   (e) redirecting means to redirect the light exiting from said variable optical delay means back through said variable optical delay means to said recombining means.

2. The system of claim 1 wherein the variable optical delay means is an electrically variable dielectric material.

3. The system of claim 2 wherein said beamsplitter and recombining means are optical prisms described to cause frustrated total internal reflection of the light in the respective prisms.

4. The system of claim 1 wherein said beamsplitter and recombining means are optical prisms designed to cause frustrated total reflection of the light in the respective prisms wherein said prisms are arranged so that the light in each path of the divided beam travels substantially identical distances between division and recombination.

References Cited
UNITED STATES PATENTS 3,233,108  2/1966  Rosenblum _____ 250—199
3,331,651  7/1967  Sterzer _____ 350—96

RONALD L. WIBERT, Primary Examiner

P. K. GODWIN, Jr., Assistant Examiner

U.S. Cl. X.R.

350—163, 286; 332—31; 356—113